US008811168B2

(12) United States Patent
Jain et al.

(10) Patent No.: US 8,811,168 B2
(45) Date of Patent: *Aug. 19, 2014

(54) TRANSIENT LOOP PREVENTION IN A HYBRID LAYER-2 NETWORK

(75) Inventors: Saurabh Jain, Sunnyvale, CA (US);
Tameen Khan, Los Angeles, CA (US);
Sanjay Sane, Freemont, CA (US);
Ronak Desai, Freemont, CA (US)

(73) Assignee: Cisco Technology, Inc., San Jose, CA (US)

( * ) Notice: Subject to any disclaimer, the term of this patent is extended or adjusted under 35 U.S.C. 154(b) by 500 days.

This patent is subject to a terminal disclaimer.

(21) Appl. No.: 13/291,638

(22) Filed: Nov. 8, 2011

(65) Prior Publication Data
US 2012/0051213 A1 Mar. 1, 2012

Related U.S. Application Data

(63) Continuation of application No. 12/475,124, filed on May 29, 2009, now Pat. No. 8,077,633.

(51) Int. Cl.
*H04J 1/16* (2006.01)
*H04L 12/56* (2006.01)

(52) U.S. Cl.
CPC .............. *H04L 45/18* (2013.01); *H04L 49/351* (2013.01); *H04L 45/04* (2013.01); *H04L 45/66* (2013.01)
USPC ......................................... 370/230

(58) Field of Classification Search
USPC .................................. 370/229–230
See application file for complete search history.

(56) References Cited

U.S. PATENT DOCUMENTS

| | | |
|---|---|---|
| 6,222,822 B1 | 4/2001 | Gerardin et al. |
| 6,333,931 B1 | 12/2001 | LaPier et al. |
| 6,393,486 B1 | 5/2002 | Pelavin et al. |

(Continued)

FOREIGN PATENT DOCUMENTS

WO  WO 2009/014967  1/2009

OTHER PUBLICATIONS

Economou, et al., Bridge Protocol for Creating a Loop-Free Topology in an Extended LAN, Computer Communications, vol. 15, No. 9, Nov. 1992, pp. 565-572, Computer Communications, Elsevier Science Publishers BV, Amsterdam, Netherlands.

(Continued)

*Primary Examiner* — Brian D Nguyen
*Assistant Examiner* — Ashil Farahmand
(74) *Attorney, Agent, or Firm* — Novak Druce Connolly Bove + Quigg LLP

(57) ABSTRACT

In one embodiment, a first switch is located at a first border between first networks that utilize a STP to detect and break loops and second networks. The first switch is interconnected via the first networks with a second switch located at a second border between the first networks and the second networks. The first switch detects, via a protocol other than STP, addition of a link in the second networks that provides a new path across the second networks between the first switch and the second switch. The first switch blocks data packets from traversing through one or more network boundary ports of the first switch coupled to the first networks, while allowing STP BPDUs to traverse through the one or more network boundary ports, for a period of time sufficient for the first networks to discover the new path using STP.

20 Claims, 6 Drawing Sheets

(56) References Cited

U.S. PATENT DOCUMENTS

| | | |
|---|---|---|
| 7,350,077 B2 | 3/2008 | Meier et al. |
| 7,496,650 B1 | 2/2009 | Previdi et al. |
| 2006/0087989 A1 | 4/2006 | Gai et al. |
| 2006/0098681 A1 | 5/2006 | Gai et al. |
| 2006/0101140 A1 | 5/2006 | Gai et al. |
| 2006/0117089 A1 | 6/2006 | Karam |
| 2006/0251067 A1 | 11/2006 | DeSanti et al. |
| 2007/0076635 A1 | 4/2007 | Tallet |
| 2007/0127395 A1 | 6/2007 | Jain et al. |
| 2007/0127396 A1 | 6/2007 | Jain et al. |
| 2007/0159987 A1 | 7/2007 | Khan et al. |
| 2007/0159988 A1 | 7/2007 | Khan et al. |
| 2007/0189157 A1 | 8/2007 | Andrews et al. |
| 2008/0205302 A1 | 8/2008 | Florit et al. |
| 2009/0190503 A1* | 7/2009 | Tallet et al. ............. 370/256 |

OTHER PUBLICATIONS

PCT Notification of Transmittal of the International Search Report and the Written Opinion of the International Searching Authority, International Application No. PCT/US2010/001488, International Filing Date: May 20, 2010, Document mailed on Aug. 30, 2010, 16 pages, European Patent Office, Rijswijk, Netherlands.

* cited by examiner

TRANSIENT LOOP PREVENTION IN A HYBRID LAYER-2 NETWORK

RELATED APPLICATIONS

This application for United States patent is a continuation of U.S. patent application Ser. No. 12/475,124 filed on May 29, 2009 by Saurabh Jain et al., entitled "Transient Loop Prevention in a Hybrid Layer-2 Network", the contents of which are incorporated by reference herein in their entirety.

TECHNICAL FIELD

The present disclosure relates generally to computer networks, and, more particularly, to transient loop prevention in hybrid layer-2 networks.

BACKGROUND

A loop-free network is an essential requirement of Layer-2 networks. As will be understood by those skilled in the art, Classical Ethernet (CE) networks use the Spanning Tree Protocol (STP) whereas Data Center Ethernet (DCE) networks use the Intermediate-System-to-Intermediate-System (IS-IS) protocol to detect and break "steady-state" loops. Preventing "transient loops" (temporary loops caused during network convergence) is an equally important requirement for these protocols. In a hybrid network, consisting of both CE networks and DCE networks, DCE networks generally act as a hub connecting various CE networks together. Accordingly, STP protocol messages sent between different CE networks are tunneled through the DCE network(s) as regular data packets. STP of the CE networks may thus operate to break any overall loops.

However, while both STP and IS-IS function appropriately within their respective networks to prevent transient loops, they are not able to prevent all the transient loops when two DCE networks merge in case of a hybrid topology. In particular, the DCE networks (IS-IS) generally converge after the merge faster than the CE networks (STP), such that any traffic using the newly merged DCE networks between CE networks may be subject to a transient loop (e.g., where the CE networks are themselves interconnected outside of the merged DCE networks) until STP has had a chance to break the loop, accordingly.

BRIEF DESCRIPTION OF THE DRAWINGS

The advantages of the invention may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
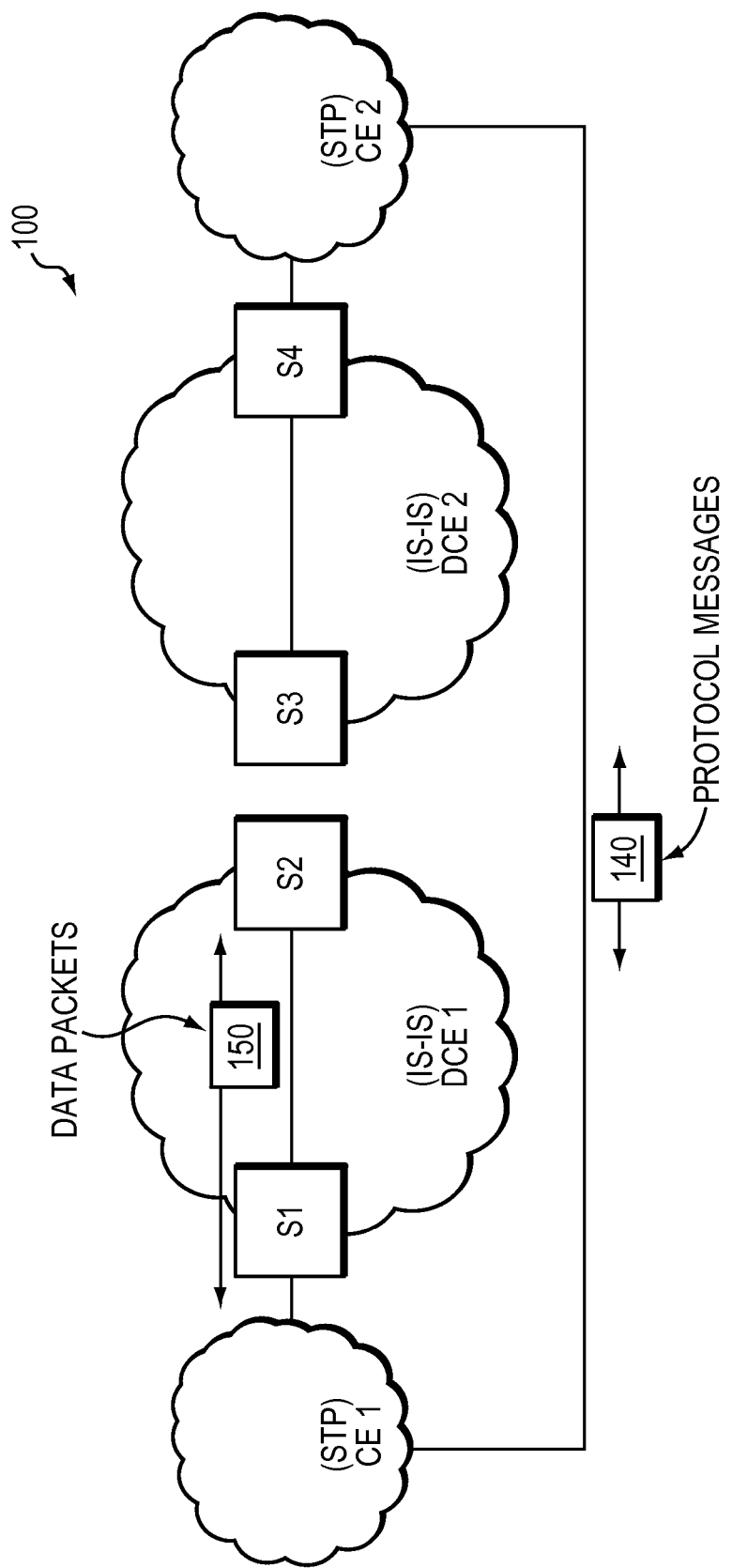
FIG. 1 illustrates an example computer network.

According to one or more embodiments of the disclosure, a first switch operating at a border between a first network of a first protocol (e.g., a Classical Ethernet or "CE" network) and a first network of a second protocol (e.g., a Data Center Ethernet or "DCE" network) is interconnected via the first CE network with a second switch at a border between a second CE network (interconnected with the first CE network) and a second DCE network. In response to detecting a merge of the first and second DCE networks, the first switch may: i) block data packets from traversing CE network boundary ports of the first switch; ii) allow protocol messages to flow between the first and second CE networks through the CE network boundary ports of the first switch; iii) allow the first and second CE networks to discover each other through the protocol messages and to prevent a loop; and in response, iv) unblock the CE network boundary ports of the first switch to allow traversal of data packets.

Description

A computer network typically comprises a plurality of interconnected entities. An entity may consist of any network device, such as a server or end station, that "sources" (i.e., transmits) or "sinks" (i.e., receives) data frames. A common type of computer network is a local area network ("LAN"), which typically refers to a privately owned network within a single building or campus. LANs typically employ a data communication protocol (LAN standard), such as Ethernet, FDDI or token ring, that defines the functions performed by the data link and physical layers of a communications architecture (i.e., a protocol stack).

One or more intermediate network devices are often used to couple LANs together and allow the corresponding entities to exchange information. For example, a switch (or bridge) may be used to provide a "switching" (or "bridging") function between two or more LANs. Typically, the switch is a computer and includes a plurality of ports that are coupled to the LANs (also called "links"). Ports that are coupled to LANs that are, in turn, coupled to other switches are generally referred to as a trunk ports, whereas ports used to couple switches through LANs to end stations are generally referred to as access ports. The switching function includes receiving data from a sending entity at a source port and transferring that data to at least one destination port for forwarding to a receiving entity.

Although switches may operate at various levels of the communication protocol stack, they typically operate at Layer-2, which, in the OSI Reference Model, is called the data link layer and includes the Logical Link Control (LLC) and Media Access Control (MAC) sub-layers. Data frames at the data link layer typically include a header containing the MAC address of the entity sourcing the message, referred to as the source address, and the MAC address of the entity to which the message is being sent, referred to as the destination address. To perform the switching function, Layer-2 switches examine the MAC destination address of each data frame received on a source port. The frame is then switched onto the destination port(s) associated with that MAC destination address.

Other devices, commonly referred to as routers, may operate at higher communication layers, such as Layer-3 of the OSI Reference Model, which in Transmission Control Protocol/Internet Protocol (TCP/IP) networks corresponds to the Internet Protocol (IP) layer. Packets at the IP layer also include a header, which contains an IP source address and an IP destination address. Routers or Layer-3 switches may re-assemble or convert received data frames from one LAN standard (e.g., Ethernet) to another (e.g. token ring). Thus, Layer-3 devices are often used to interconnect dissimilar subnetworks.

FIG. 1 is a schematic block diagram of an example computer network 100 illustratively comprising nodes/devices, such as switches S1-S4 interconnected by links as shown. In particular, bridges S1 and S2 are illustratively part of a first Data Center Ethernet (DCE) network (DCE1) and S3 and S4 are illustratively part of a second DCE is network (DCE2). Further, S1 is interconnected with a first Classical Ethernet (CE) network (CE1) and S4 is interconnected with a second CE network (CE2), where CE1 and CE2 are interconnected as well. In such a hybrid network, consisting of both CE and DCE networks, the DCE networks typically act as a hub connecting various CE networks together for transmission of data packets 140 (assume, for now, that DCE1 and DCE2 are not yet interconnected, as described below). In this manner, protocol messages 150 between the different CE networks are tunneled through the DCE networks as regular data packets 140.

Generally, the CE networks and DCE networks operate according to first and second distinct protocols. For instance, according to an illustrative embodiment described herein, the DCE networks may operate using an Intermediate-System-to-Intermediate-System (IS-IS) protocol, and the CE networks may operate using a Spanning Tree Protocol (STP) (thus the protocol messages 150 between CE networks would be STP bridge protocol data units, "BPDUs"). Note that the terms "CE network" and "DCE network" as used herein are merely descriptive of two separately managed networks of distinct protocols interconnected by boundary/border switches. Thus, a "hybrid Layer-2 network" herein implies a computer network 100 having at least one network of a first protocol and at least one network of a second protocol, where the interoperation of the separately managed networks may result in a transient loops as described herein.

Since network 100 comprises switches (or bridges), and illustratively operates according to Layer-2, the network 100 may be referred to herein as a "switched network (or "bridged network") accordingly. Those skilled in the art will understand that any number of nodes, devices, links, etc. may be used in the computer network, and that the view shown herein is for simplicity. For example, while the network 100 of switches is shown as a simple segment of a small number of switches, the embodiments described herein may also be applicable to "chains" or "rings" of bridges, e.g., large numbers of bridges. Those skilled in the art will also understand that while the embodiments described herein are described generally, they may apply to any network. The computer (switched) network 100 of FIG. 1 is meant for illustration purposes only and is not meant to limit the embodiments described herein. For example, CE1 and CE2 may actually be the same CE network, and the separate clouds and interconnecting link are merely illustrative.

Figure 2:
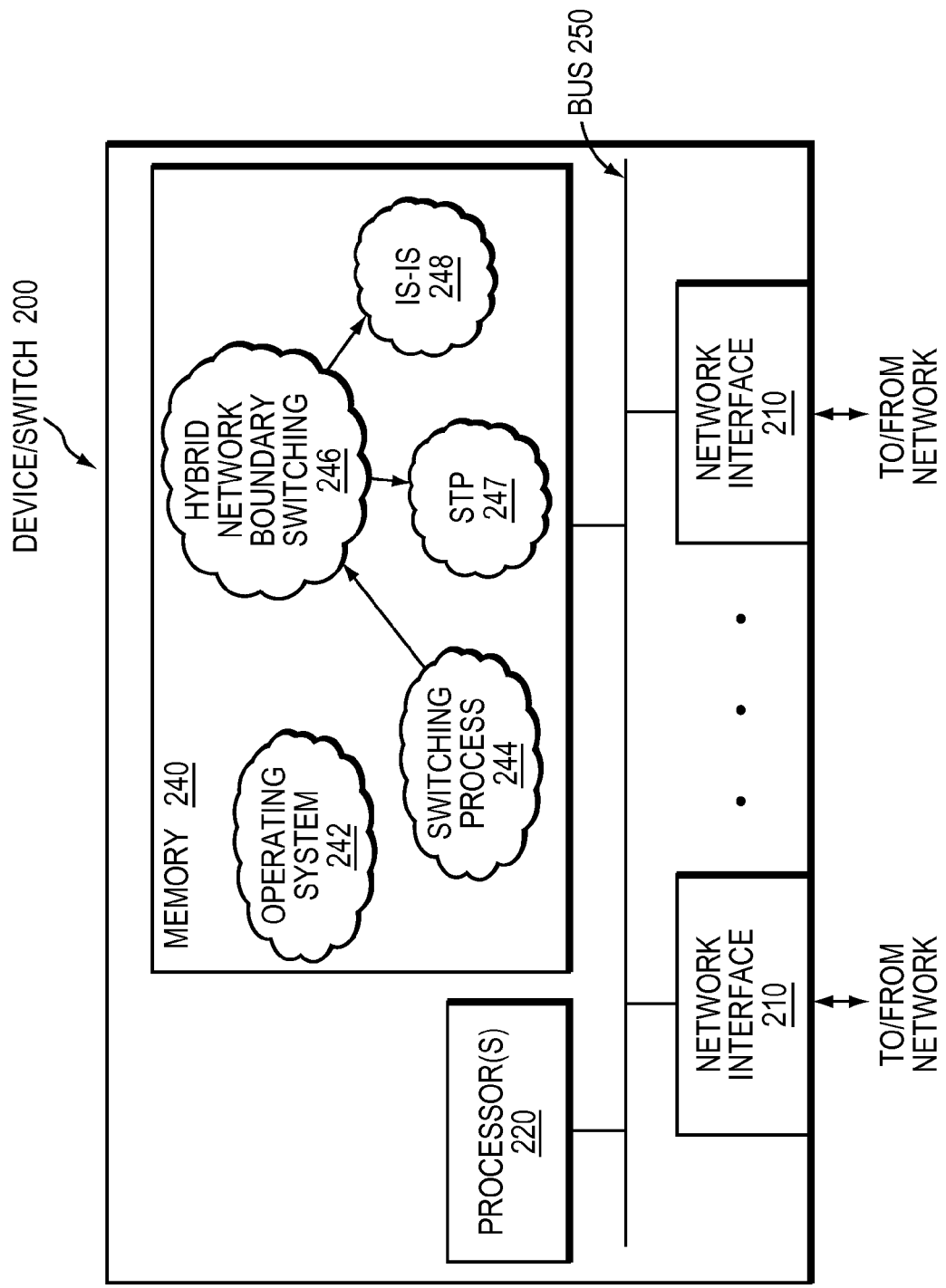
FIG. 2 illustrates an example network device/node.

FIG. 2 is a schematic block diagram of an example node/device 200 that may be advantageously used with one or more embodiments described herein, e.g., as a switch (particularly, as used herein, a "boundary switch" S1 and/or S4). The device comprises a plurality of network interfaces or ports 210, one or more processors 220, and a memory 240 interconnected by a system bus 250. The network interfaces/ports 210 contain the mechanical, electrical, and signaling circuitry for communicating data over physical links coupled to the network 100, particularly on Layer-2. The network interfaces/ports may be configured to transmit and/or receive data (frames) using a variety of different communication protocols over physical links or wireless links. For example, such communication protocols may include, inter alia, TCP/IP, UDP, ATM, synchronous optical networks (SONET), wireless protocols (e.g., IEEE Std. 802.11), Frame Relay, Ethernet (e.g., IEEE Std. 802.3), Fiber Distributed Data Interface (FDDI), etc. Notably, a network interface/port 210 may also be used to implement one or more virtual network interfaces, such as for Virtual Private Network (VPN) access or Virtual LANs (VLANs), as will be understood by those skilled in the art. Illustratively, the handling of frames within the network interfaces/ports 210 may conform to a protocol stack (not shown) that defines the functions performed by the data link and physical layers of a communications architecture. As used herein, a network interface of the switch 200 facing the CE network (a network operating a first protocol, e.g., STP) may be referred to as a CE network interface, while a network interface of the switch facing the DCE network (a network operating a second protocol, e.g., IS-IS) may be referred to as a DCE network interface. (A switch is generally considered a border or boundary switch when it has ports for both the first and second protocol.)

The memory 240 comprises a plurality of storage locations that are addressable by the processor(s) 220 and the network interfaces/ports 210 for storing software programs and data structures associated with the embodiments described herein. The processors 220 may comprise necessary elements or logic adapted to execute the software programs and manipulate the data structures. An operating system 242 (e.g., the Internetworking Operating System, or IOS™, of Cisco Systems, Inc.), portions of which are typically resident in memory 240 and executed by the processor(s), functionally organizes the node by, inter alia, invoking network operations in support of software processes and/or services executing on the device. These software processes and/or services may comprise an illustratively simplified "switching process" 244, along with an illustrative hybrid network boundary switching process 246, as described herein (having a first protocol, "STP" component 247 and a second protocol, "IS-IS" component 248). It will be apparent to those skilled in the art that other types of processors and memory, including various computer-readable media, may be used to store and execute program instructions pertaining to the inventive technique described herein.

Switching (or bridging) process 244 contains computer executable instructions executed by the processor(s) 220 to perform various functions relating to switches or bridges in general, as may be appreciated by those skilled in the art. For instance, these functions may be configured to manage switching databases (e.g., spanning tree instances), link state databases (LSDBs), filtering databases (FDBs), or forwarding information databases (FIBs) containing, e.g., data used to make switching/forwarding decisions. In particular, in addition to the novel techniques described herein, as part of switching process/services, a spanning tree process may execute to perform functions provided by one or more spanning tree protocols (STPs) through sub-process 247, and a link-state protocol process may execute to perform switching-based (Layer-2) link state protocols (e.g., IS-IS) through sub-process 248.

As noted above, a loop-free network is an essential requirement of Layer-2 networks. As will be understood by those skilled in the art, Classical Ethernet (CE) networks use the Spanning Tree Protocol (STP) whereas Data Center Ethernet (DCE) networks use the Intermediate-System-to-Intermediate-System (IS-IS) protocol to detect and break "steady-state" loops. Preventing "transient loops" (temporary loops caused during network convergence) is an equally important requirement for these protocols.

Generally, for loop-breaking (or prevention), STP uses Color Blocking Logic (CBL) programming, whereas IS-IS uses an Immediate Interface Check (IIC), as will also be understood by those skilled in the art. In other words, forwarding is governed by CBL states programmed by STP in CE networks and IIC programmed by IS-IS in DCE networks. In a hybrid network, comprising of both CE and DCE (or more generally, a first STP protocol and second non-STP protocol), network-wide transient loops might arise during various topology change events if the programming of CBL and IIC tables is not coordinated.

Figure 3A:
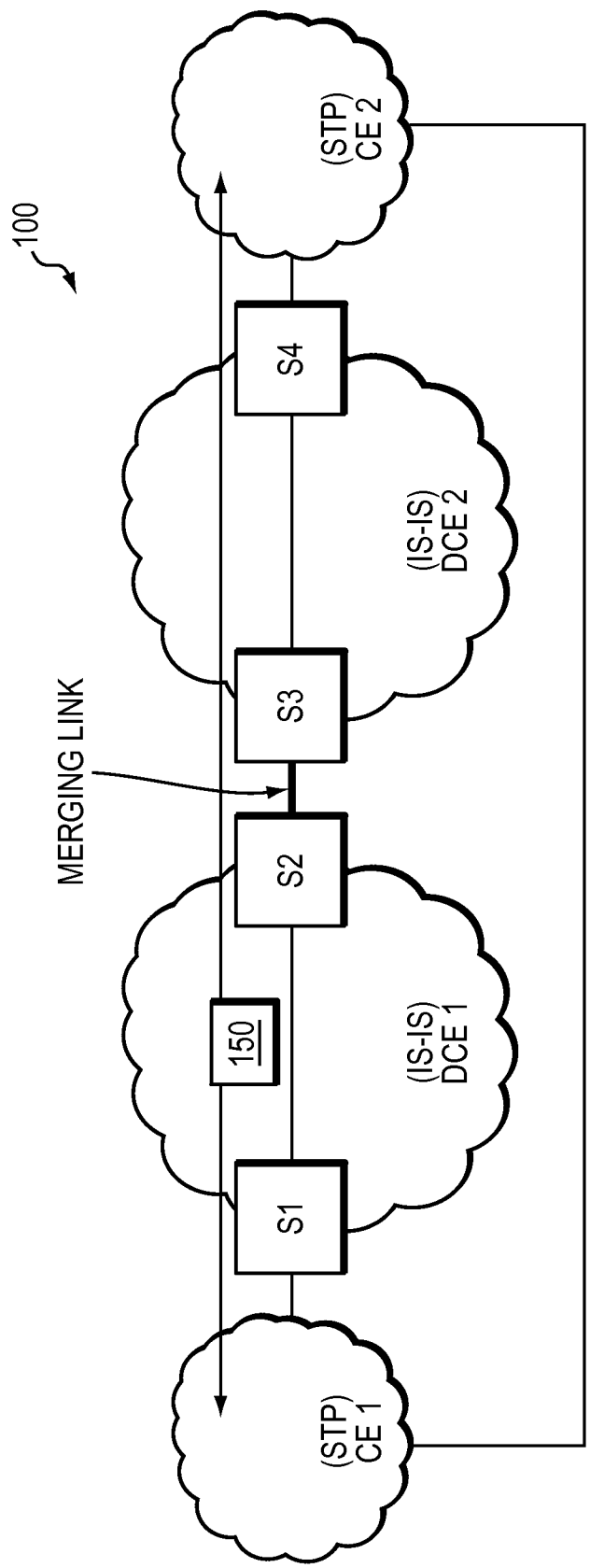
FIGS. 3A-C illustrate the example computer network after a topology change.

For instance, with reference to FIGS. 1 and 3A, CE1 and CE2 are initially connected to each other, and S1, S2, S3, and S4 are DCE switches that illustrative execute the IS-IS protocol, and in one or more embodiments herein, it is not necessary to execute STP on the boundary switches S1 and S4. CE1 is connected to S1 and CE2 is connected to S4. Now, assume that the DCE networks merge, such that S2 and S3 are connected to each other (as shown by the new link in FIG. 3A). Conventionally, the following events would generally take place:

- a.) On S1, IS-IS discovers the new DCE switches (S3 and S4) and programs IIC on its DCE-facing interfaces. Due to this, S1 starts accepting traffic originating from S3 and S4. Similarly IIC is programmed for S1 and S2 on S4.
- b.) Protocol messages (e.g., STP BPDUs) between CE1 and CE2 are tunneled across the DCE networks through S1 and S4. Essentially, STP BPDUs travel through the DCE networks as multicast data packets, and are emitted out of DCE edge ports.
- c.) Once the BPDUs are tunneled, STP on CE1 and CE2 performs a recomputation, which blocks the overall loop.

However, since IIC is programmed before STP completes its re-computation (e.g., a Common Spanning Tree (CST) calculation), transient loops can occur. For example, in the steps above, S1 starts accepting data packets from S4 and forwards them out to CE1, but since STP has yet to detect the new connection between CE1 and CE2 (via the merged DCE networks), and has thus not completed the STP re-computation, the overall loop between CE1 and CE2 is not yet broken. Thus, CE1 forwards the packet to CE2 (via the external CE link), which in turn forwards it back to S4, resulting in a transient loop.

Pure DCE networks (non-hybrid networks) carry a MAC-in-MAC header, which contains a decremented time-to-live (TTL) value, as will be understood by those skilled in the art. Therefore, if there is a transient loop in a pure DCE network, the loop is mitigated due to TTL. However, there is no mitigation for the CE-DCE overall loop, as the TTL value is not present when the packet is emitted as CE packet. Thus, the severity of this transient loop is very high, and it is very important to avoid it.

Preventing Transient Loops in Hybrid Layer-2 Networks

According to embodiments of the disclosure, a technique is described that operates on the switches at the boundary of a hybrid Layer-2 network (e.g., the CE and DCE networks) to prevent such transient loops. Illustratively, a handshake mechanism (or a sequencing of operations) may be performed at the boundary switches (e.g., and only at the boundary switches) and requires no modifications in existing protocols in the networks (e.g., STP and IS-IS). In particular, a switch operating at a border/boundary between a first CE network (a first protocol network, generally) and a first DCE network (a second protocol network, generally) may detect a merge of the first and second DCE networks. In response, a switch (e.g., S1 and/or S4) may (as described in further detail below):

- i) block data packets from traversing its CE-facing ports while allowing protocol messages (e.g., STP BPDUs) to flow between the first and second CE networks through its CE-facing ports;
- ii) allow the first and second CE networks to discover each other through the protocol messages and to prevent a loop (e.g., through a timer or participating in the STP re-computation); and in response,
- iii) unblock its CE network boundary ports to allow traversal of data packets.

Illustratively, the techniques described herein may be performed by hardware, software, and/or firmware, such as in accordance with a hybrid network boundary switching process 246 (of switching process 244, generally), which may contain computer executable instructions executed by the processor 220 to perform functions relating to the novel techniques described herein, e.g., in conjunction with STP component 247 and IS-IS component 248 where applicable.

Operationally, to prevent the transient loops, techniques described herein coordinate the sequence in which IS-IS and STP program their respective hardware tables. That is, on a boundary switch (e.g., S1 and/or S4), prior to programming a new IS-IS IIC entry, the links connected to the CE network are blocked for any data packets, while allowing STP BPDUs to be tunneled through the DCE networks. Specifically, the blocking of CE ports for data packets prevents the flow of packets that may cause transient loops. At the same time, however, by continuing to tunnel the STP BPDUs across the DCE networks, the appropriate STP calculations may be made, upon completion of which the switch may program the forwarding state of the CE links appropriately.

As noted, the first step is detection of the DCE networks merging (e.g., the added link between S2 and S3 in FIG. 3A). Illustratively, the detection is achieved when a new IIC entry (e.g., IIC entry for a new switch) to be programmed. For instance, S1 will have originally had an IIC entry for S2, and once the two DCE networks are merged, a new entry with S2, S3, and S4 will be received, and thus detected. Conversely, S4 will have originally known of S3, and then a new IIC entry of S3, S1, and S2 will have been received and detected. Other detection techniques may also be used (e.g., explicit advertisements or notifications, etc.), and the IIC entry example is merely illustrative (and specific to IS-IS DCE networks).

Figure 3B:
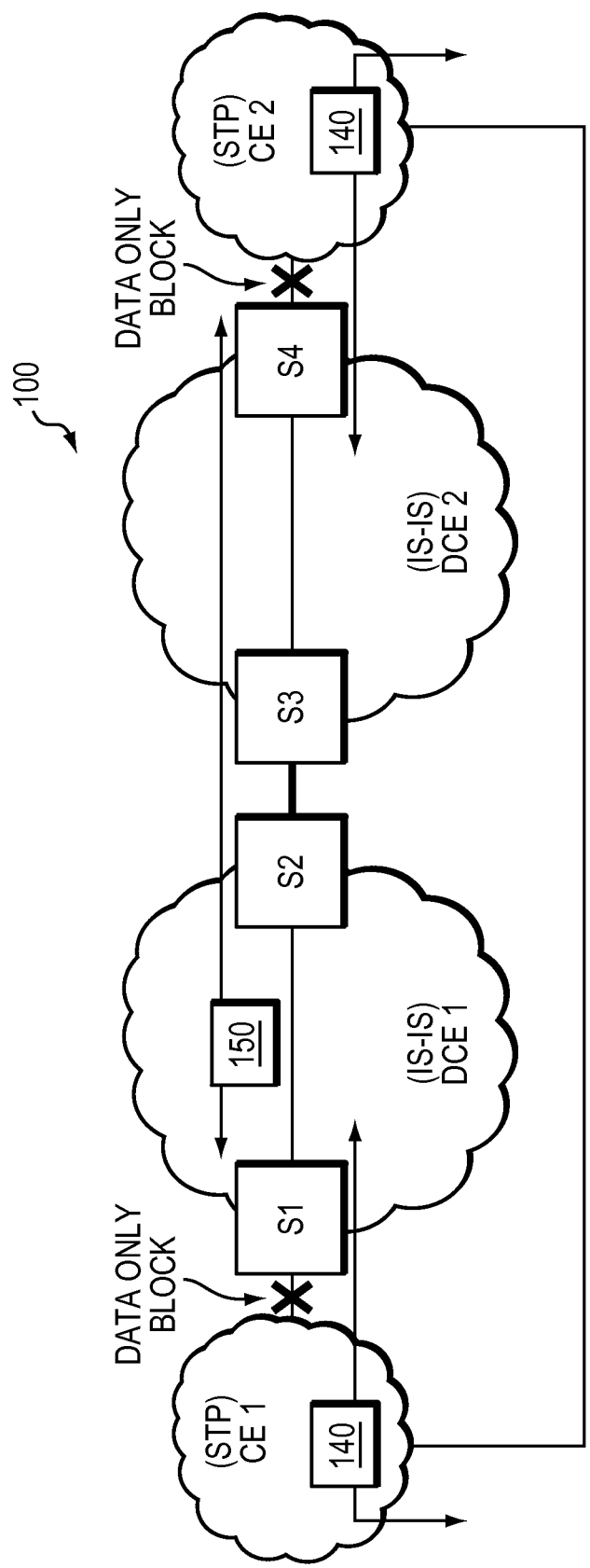

Once the merge is detected, the boundary switches block their boundary ports (e.g., DCE edge ports connected to the CE networks), such as by configuring STP CBL for data packets on those ports (as shown in FIG. 3B, where the "X"s denote a blocked interface/port). That is, dropping (blocking) data packets at the boundary is generally better than looping the data packets, e.g., indefinitely. In further response to the merge, the switch may converge within the DCE networks, such as by performing appropriate protocol action, e.g., programming of the IS-IS IIC. Also, an optional (and configurable) timer may be initiated at this point.

While the CE-facing boundary ports are being blocked for data traffic, the boundary switches still allow CE network protocol messages (e.g., STP BPDUs) to flow through the "blocked" boundary ports, in order to thus traverse through the DCE networks (e.g., its corresponding broadcast tree, as will be appreciated by those skilled in the art). In this manner, the switches allow the first and second CE networks (CE1 and CE2) to discover each other through the protocol messages (received from opposing sides of the DCE networks) and to thus prevent the resultant loop according to STP operation. The CE network boundary ports may then be unblocked (e.g., by removing the CBL blocking state) to allow traversal of data packets (and protocol messages) across the interface.

Figure 3C:
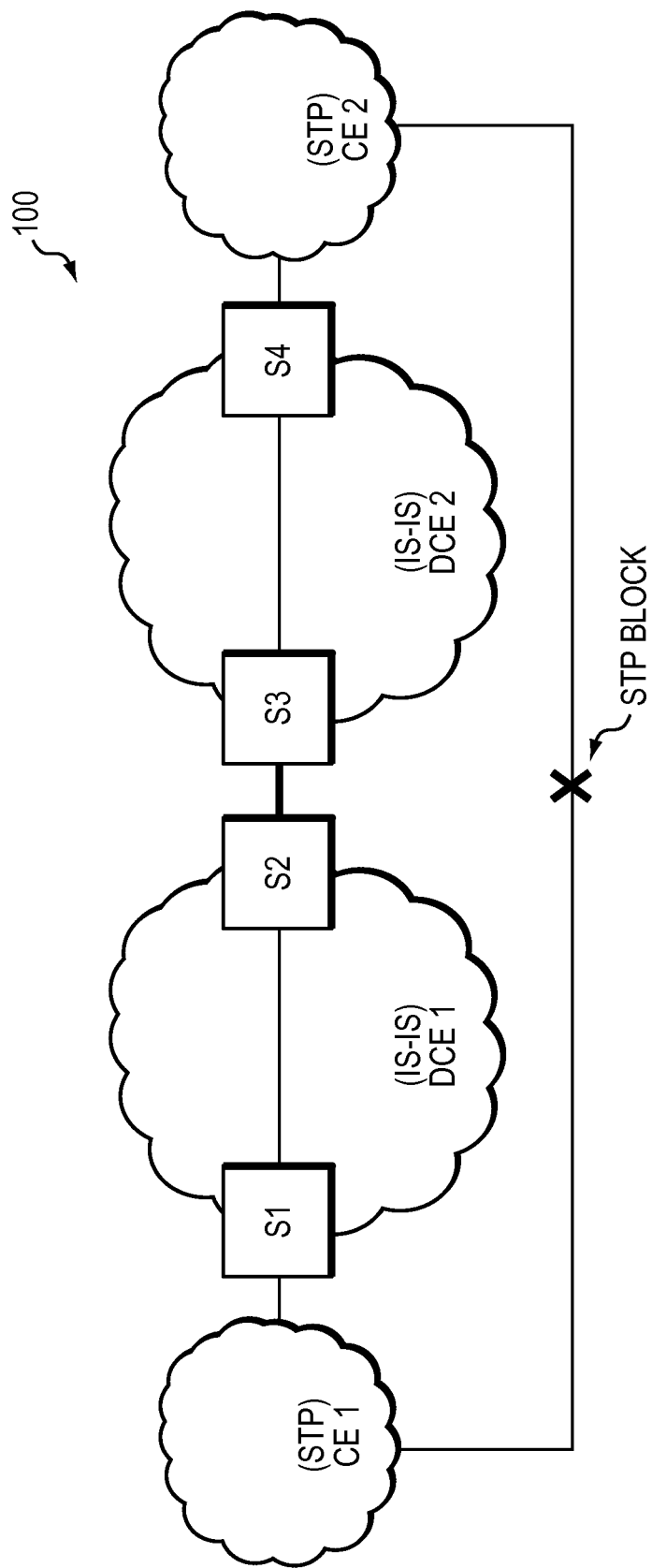

The boundary ports may be blocked for a period sufficient for CE1 and CE2 to discover each other and perform the STP re-computation to block any loops (e.g., until expiration of the configurable timer). (Note that the techniques described herein may be used even where no loop would have existed as a preventative and protective measure.) That is, STP re-computation would detect the overall CE-DCE loop and break the loop (as shown in FIG. 3C), such that data packets would not loop across the overall CE-DCE loop. Generally, the break of the loop will occur on the CE-CE link, as the switches are conventionally configured to see the DCE networks as a single link (e.g., a tunnel) that is typically not to be broken (blocked).

Had STP been operating on the boundary switches (an optional embodiment as an alternative to or in addition to the timer above), then the switches may be configured to unblock the CE-facing interfaces after detecting STP re-computation (and thus discovery of the opposing CE network, e.g., CE2 for S1 and CE1 for S4). Since the boundary switches in this embodiment participate in STP of the CE networks, they would be directly aware of the convergence and any subsequent blocking, and thus need not wait for expiration of the timer.

Figure 4:
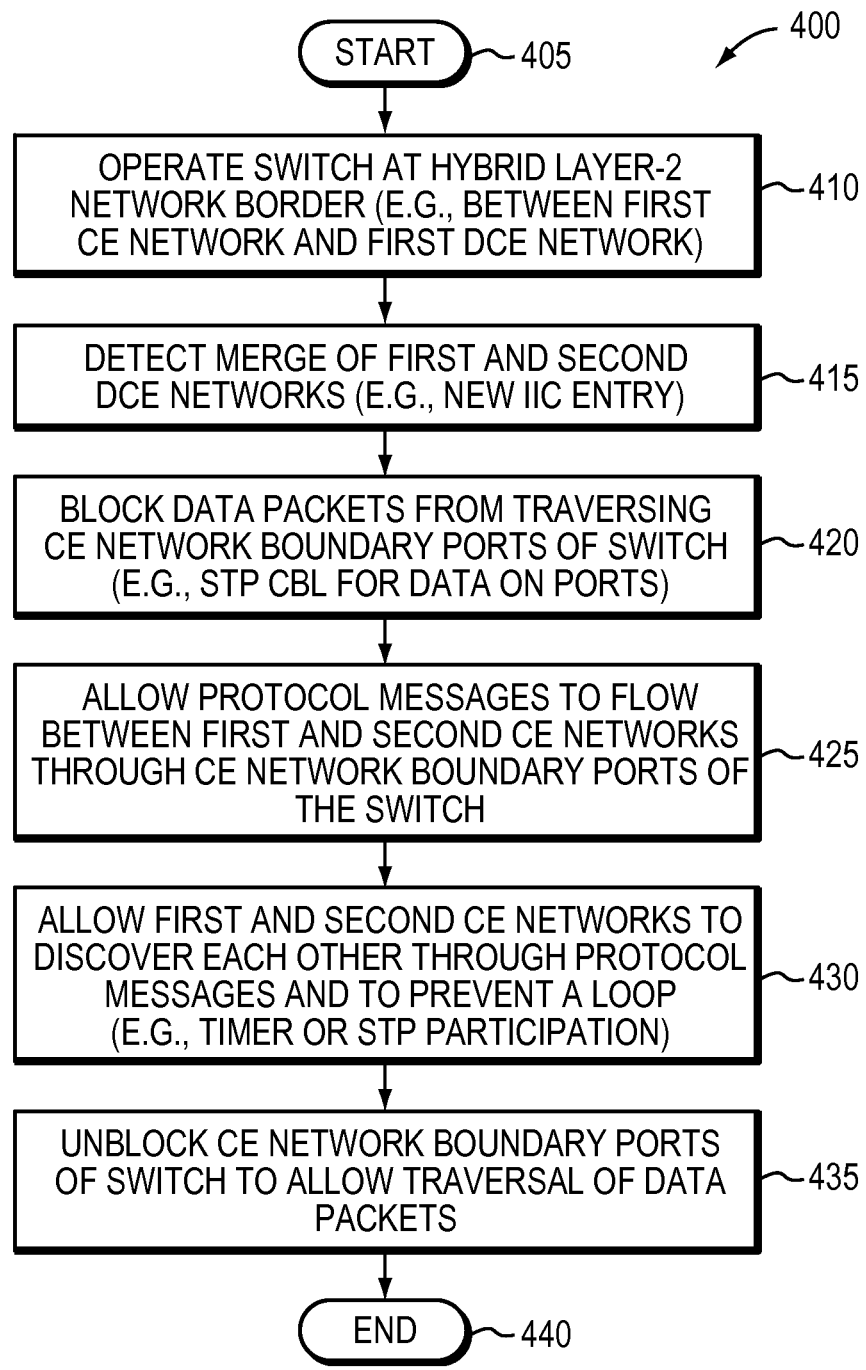
FIG. 4 illustrates an example procedure for preventing transient loops.

FIG. 4 illustrates an example procedure for preventing transient loops in accordance with one or more embodiments described herein. The procedure 400 starts at step 405, and continues to step 410, where a switch (e.g., S1 or S4) operates at a hybrid layer-2 network border (e.g., between a first CE1 network and first DCE1 network). Upon detecting a merge of the first and second DCE networks (DCE1 and DCE2) in step 415, for instance, through detecting a new IIC entry as mentioned above, the sequence of events from step 420 to 435 may be correspondingly executed. In particular, in step 420, data packets are blocked from traversing the switch's CE network boundary ports, such as through STP CBL blocking of the data on the ports. At the same time, in step 425, the switch allows protocol messages (e.g., STP BPDUs) to flow between first and second CE networks through its CE network boundary ports.

In step 430, the switch may affirmatively allow the first and second CE networks to discover each other through the protocol messages and to prevent a loop. For example, where the protocol messages are STP BPDUs, the STP algorithms of the CE networks will detect the loop and prevent it accordingly, prior to any data packets from being caught in such a loop (since they are blocked from being forwarded as in step 420). As noted above, the affirmative allowance may take the form of a configurable timer to allow time for the STP computation to take place, or, where the boundary switches execute and participate in STP of the CE networks, the affirmative allowance may be detection of a re-computation and subsequent blocking of the CE1-CE2 path by STP. After step 430 has completed, in step 435 the switch unblocks its CE network boundary ports to allow traversal of data packets, and with STP having blocked the CE1-CE2 paths, without the data packets having been looped, even transiently. The procedure 400 then ends in step 440.

Advantageously, the novel techniques described herein prevent transient loops in a hybrid layer-2 network (e.g., between CE and DCE networks). By providing the novel sequence of operation to boundary switches between the networks (thus not changing the functionality and role of other CE and DCE switches in the network), the novel techniques prevent transient loops in hybrid networks without modifying the behavior of individual protocols (e.g., STP or IS-IS). In particular, the techniques described above function regardless of whether STP is running on the DCE switches, making deployment and integration with existing networks simple, and are computationally inexpensive and easy to manage (e.g., being "plug-and-play" by detecting CE and DCE networks automatically without configuration or user intervention).

While there have been shown and described illustrative embodiments that prevent transient loops in a hybrid layer-2 network, it is to be understood that various other adaptations and modifications may be made within the spirit and scope of the present invention. For example, the embodiments have been shown and described herein specifically directed to CE networks utilizing STP, and DCE networks utilizing IS-IS. However, the embodiments of the invention in their broader sense are not so limited, and may, in fact, be used with any networks that are arranged to operate in a similar manner. For instance, the terms "CE network" and "DCE network" as used herein are merely descriptive of two separately managed networks interconnected by boundary/border switches, where the inter-operation of the separately managed networks (of a first and second distinct protocol) may result in a transient loop based on discrepancies in loop prevention techniques and timing of the two distinct protocols. That is, the terms "CE network" and "DCE network" as used herein are for the convenience of the reader based on the current state of art of hybrid layer-2 networks, and are not meant to be limiting to the scope of the appended claims.

Note also that the term Spanning Tree Protocol (STP) as used herein includes any version of STP, including for example, traditional STP (IEEE 802.1d), Rapid Spanning Tree Protocol (RSTP) (IEEE 802.1w), Multiple Spanning Tree Protocol (MSTP) (IEEE 802.1s), or any other Spanning Tree Protocol. The techniques described herein, therefore, may be used to prevent transient loops in any networks in which at least two of the networks include devices utilizing different protocols for providing a loop-free topology. For example, the system and method may be used with any combination of STP/RSTP/MSTP networks (i.e., networks of a first protocol, e.g., CE networks) and non-STP networks (i.e., networks of a second protocol, e.g., DCE networks).

Accordingly, the foregoing description has been directed to specific embodiments of this invention. It will be apparent, however, that other variations and modifications may be made to the described embodiments, with the attainment of some or all of their advantages. For instance, it is expressly contemplated that the components and/or elements described herein can be implemented as software being stored on a tangible computer-readable medium (e.g., disks/CDs/etc.) having program instructions executing on a computer, hardware, firmware, or a combination thereof. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method, comprising:
   operating a first switch located at a first border between first networks that utilize a Spanning Tree Protocol (STP) to detect and break loops and second networks that utilize a protocol other than STP to detect and break loops, the first switch interconnected via the first networks with a second switch located at a second border between the first networks and the second networks;
   detecting, via the protocol other than STP, addition of a link in the second networks that provides a new path across the second networks between the first switch and the second switch;

in response to the detecting addition of the link, blocking data packets from traversing through one or more network boundary ports of the first switch coupled to the first networks, while allowing STP Bridge Protocol Data Units (BPDUs) to traverse through the one or more network boundary ports of the first switch coupled to the first networks, for a period of time sufficient for the first networks to discover the new path using STP; and after the period of time, unblocking the one or more network boundary ports of the first switch coupled to the first networks.

2. The method of claim 1, wherein the blocking further comprises:
configuring STP color blocking logic (CBL) at the one or more network boundary ports to block the data packets.

3. The method of claim 1, wherein the unblocking further comprises:
initiating a timer; and
unblocking the one or more network boundary ports of the first switch coupled to the first networks in response to expiration of the timer.

4. The method of claim 1, wherein the unblocking further comprises:
detecting a STP re-computation; and
unblocking the one or more network boundary ports of the first switch coupled to the first networks in response to the STP re-computation.

5. The method of claim 1, wherein the protocol other than STP is an Intermediate-System-to-Intermediate-System (IS-IS) protocol.

6. The method of claim 5, wherein the detecting addition of a link further comprises:
detecting existence of a new IS-IS Immediate Interface Check (IIC) entry at the first switch.

7. The method of claim 1, wherein the second networks comprise a first-second network and a second-second network and the detecting further comprises:
detecting a merge of the first-second network and the second-second network by the addition of the link that provides the new path.

8. The method of claim 1, wherein the first networks comprise a first-first network and a second-first network and the first switch is located at a border between the first-first network and the second networks and the second switch is located at a border between the second-first network and the second networks.

9. The method of claim 1, wherein the first networks are Classical Ethernet (CE) networks.

10. The method of claim 9, wherein and the second networks are Data Center Ethernet (DCE) networks.

11. The method of claim 1, wherein the first networks are a first type of layer-2 network and the second networks are a second type of layer-2 network and the first networks and the second networks collectively form a hybrid layer-2 network.

12. An apparatus, comprising:
one or more first network interfaces configured to communicate with first networks that utilize a Spanning Tree Protocol (STP) to detect and break loops;
one or more second network interfaces configured to communicate with sec- and networks that utilizes a protocol other than STP to detect and break loops;
a processor coupled to the one or more first network interfaces and the one or more second network interfaces, the processor configured to execute one or more processes; and a memory configured to store a hybrid network boundary switching process executable by the processor, the hybrid network boundary switching process when executed operable to:
detect, via the protocol other than STP, addition of a link in the second networks that provides a new path across the second networks between the apparatus and a second switch located at a border between the first networks and the second networks,
block data packets from traversing through the one or more first network interfaces, yet allow STP Bridge Protocol Data Units (BPDUs) to traverse through the one or more first network interfaces, for a period of time sufficient for the first networks to discover the new path using STP, and
after the period of time, unblock the one or more first network interfaces.

13. The apparatus of claim 12, wherein the hybrid network boundary switching process is operable to block data packets from traversing through the one or more first network interfaces by using STP color blocking logic (CBL) at the one or more network boundary ports to block the data packets.

14. The apparatus of claim 12, wherein the hybrid network boundary switching process is further operable to:
initiate a timer, and
unblock the one or more first network interfaces in response to expiration of the timer.

15. The apparatus of claim 12, wherein the hybrid network boundary switching process is further operable to:
detect a STP re-computation, and
unblock the one or more first network interfaces in response to the STP recomputation.

16. The apparatus of claim 12, wherein the protocol other than STP is an Intermediate-System-to-Intermediate-System (IS-IS) protocol.

17. The apparatus of claim 12, wherein the hybrid network boundary switching process is operable to detect addition of a link by detection of a new Immediate Interface Check (IIC) entry.

18. The apparatus of claim 12, wherein the first networks comprise a first-first network and a second-first network, and the second networks comprise a first-second network and a second-second network and the apparatus is located at a border between the first-first network and the first-second network and the second switch is located at a border between the second-first network and the second-second network.

19. The apparatus of claim 12, wherein the first networks are Classical Ethernet (CE) networks and the second networks are Data Center Ethernet (DCE) networks.

20. Software encoded on one or more non-transitory computer readable media that when executed is operable to:
detect, at a first switch located at a first border between first networks that utilize a Spanning Tree Protocol (STP) to detect and break loops and second networks that utilize a protocol other than STP to detect and break loops, addition of a link in the second networks that provides a new path across the second networks between the first switch and a second switch located at a second border between the first networks and the second networks;
in response to detection of the addition of the link, block data packets from traversing through one or more network boundary ports of the first switch coupled to the first networks, while allowing STP Bridge Protocol Data Units (BPDUs) to traverse through the one or more network boundary ports of the first switch coupled to the first networks, to permit the first networks to discover the new path using STP; and subsequent to the networks having discovered the new path using STP, unblock the one or more network boundary ports of the first switch coupled to the first networks.

* * * * *